A. H. STEWART.
BICYCLE WHEEL SUSPENSION.
APPLICATION FILED JULY 13, 1912.
1,077,105. Patented Oct. 28, 1913.
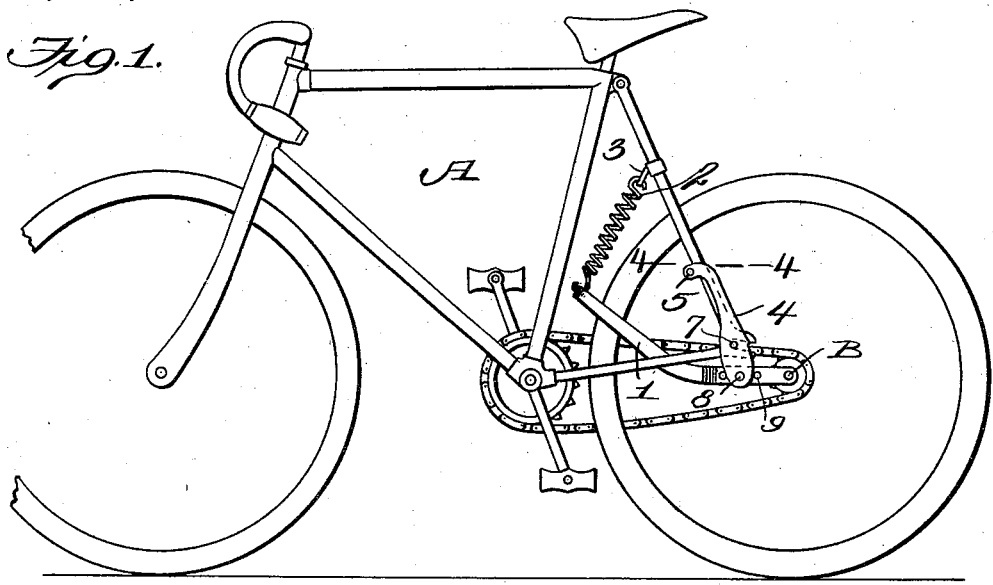
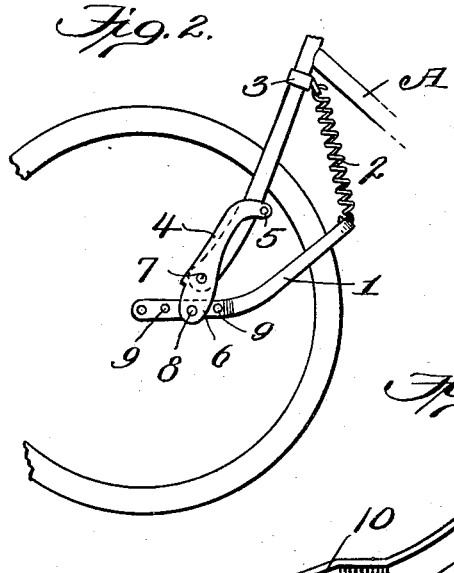
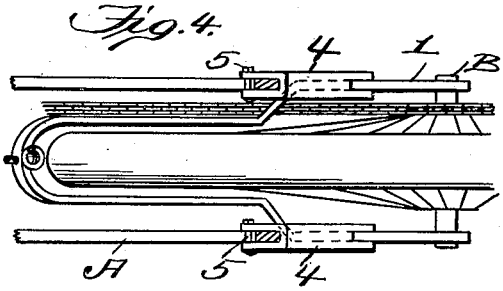
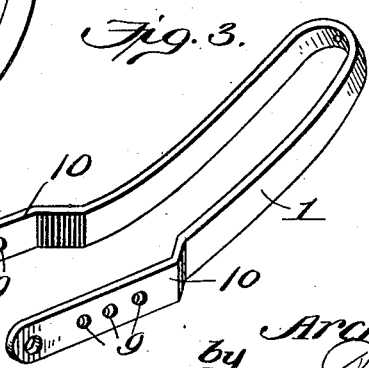
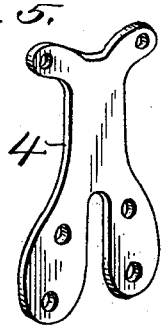
Inventor
Archibald H. Stewart
Witnesses:
John D. Powers

UNITED STATES PATENT OFFICE.

ARCHIBALD H. STEWART, OF CLINTON, IOWA.

BICYCLE WHEEL SUSPENSION.

1,077,105.  Specification of Letters Patent.  Patented Oct. 28, 1913.

Application filed July 13, 1912. Serial No. 709,251.

*To all whom it may concern:*

Be it known that I, ARCHIBALD H. STEWART, a citizen of the United States, residing at Clinton, in the county of Clinton and State of Iowa, have invented new and useful Improvements in Bicycle Wheel Suspension, of which the following is a specification.

This invention relates to improvements in the means of connection between the frame and the wheels of a bicycle, the construction being of that type wherein, in lieu of a direct connection between the frame and the wheels, a yieldable, intermediate, spring supported yoke is employed, for the purpose of relieving jars and vibrations.

The principal object of the invention is to provide connections of the character stated, which may be attached to existing bicycle or other vehicle frame constructions without involving any change in the latter and without necessitating any departure from the standard lines, and at the same time, which shall be intrinsically stronger and less liable to breakage or derangement than known constructions of the general type referred to.

An embodiment of the invention is illustrated in the accompanying drawings, wherein:

Figure 1 is a side elevation of a bicycle wherein the improved connection is interposed between the frame and the rear wheel; Fig. 2 is a similar view showing the improved connection between the frame and the front wheel; Fig. 3 is a detail perspective view of the yoke element of the connection; Fig. 4 is an enlarged sectional view on the line 4—4 of Fig. 1; Fig. 5 is a detail perspective view of the blank from which the bars which connect the yoke to the frame of the bicycle are fashioned.

Similar characters of reference designate corresponding parts throughout the several views.

The improved connection herein described may be applied to either the rear wheel, or to the front wheel, or to both. In Fig. 1, the connection is shown as between the frame of the bicycle and the rear wheel.

The bicycle frame A may be of any ordinary or standard construction. The connection between the frame and the wheels of the bicycle comprises a substantially U-shaped yoke 1, the ends of which are solidly connected to an axle B of the wheels. The closed end of the yoke 1 is supported by a spring 2 from the frame A, the ends of the spring 2 being connected to said closed end of the yoke 1 and to a cross piece 3, arranged between the rear rods of the frame and under the seat. In prior constructions where a yoke corresponding to the yoke 1 has been employed, such yoke has been connected directly to the frame of the bicycle, but a direct connection between the yoke and the frame is not practical, inasmuch as it frequently necessitates departures from standard constructions of frames, and is, therefore, not applicable to existing bicycles, and also inasmuch as it is intrinsically weak and renders the associated parts liable to breakage and derangement. To connect the yoke 1 and the frame, bars 4, which are preferably slightly curved, are employed. Each bar 4 has its upper portion fashioned as a clip to engage over a rear rod of the frame, being held fast thereon by a bolt 5, and its lower portion fashioned as a fork 6, through which a bolt 7, employed as an additional means of connection between the bar 4 and the frame, is passed, the bolt 7 being also passed through the ends of the frame which are fashioned for connection to the wheel. The forked portion 6 of the bar 4 is pivotally connected, as by a bolt 8, which is arranged below the bolt 7, to the yoke 1, somewhat adjacent the open end of the latter, the side bars of said yoke adjacent the open end being provided with a number of openings 9, through any selected alining pairs of which the bolt 8 may be passed.

It will be understood that the bars 4 are clamped to the front or rear forks of the frame A and are arranged in pairs, one of said bars being located at each side of the wheel, as shown in Fig. 4. When the connection is employed between the frame A and the rear wheel, the side bars of the yoke 1 are formed, slightly in advance of the line of apertures 9 or of the connection 8 between the bar 4 and said yoke, with offsets 10, whereby the side bars of the yoke are clear of the bridge bars which connect the crank hanger and the rear fork. Those portions of the side bars of the yoke 1 which extend between the open end of said yoke and the offsets 10 are spaced from one another to the same extent as the bars of the rear fork of the frame A, and it follows that the connections between the ends of the side bars of the yoke 1 and the axle B are in line with, or in the plane of, the side bars of the rear fork of the frame A. While a yoke having the offsets 10 may be used in connecting the front wheel to the front of the frame A, said offsets are not as necessary in this instance as they are when the connection is between the frame A and the rear wheel.

Having fully described my invention, I claim:

1. The combination with a bicycle frame and the wheels, of a means of connection between a fork of said frame and a wheel which comprises a yoke having an end connected to the axle of said wheel, a spring interposed between the other end of the yoke and the frame to support the former and bars rigidly and separably secured to the bars of said fork and to which the side bars of said yoke are pivoted below said fork.

2. The combination with a bicycle frame and the wheels, of a means of connection between the rear fork of said frame and the rear wheel which comprises a yoke having an end connected to the axle of said wheel, a spring interposed between the other end of the yoke and the frame to support the former, and bars rigidly and separably secured to the bars of said fork and to which the side bars of said yoke are pivoted below said fork, said side bars having offsets in advance of their pivotal connections with said rigidly and separably secured bars.

3. The combination with a bicycle frame and the wheels, of a means of connection between a fork of said frame and a wheel which comprises a yoke having an end connected to the axle of said wheel, a spring interposed between the other end of the yoke and the frame, to support the former, and bars clamped to said fork of the frame and terminating in forks which are bolted to the ends of the bars of the frame fork and to which the side bars of said yoke are pivoted below said frame fork.

In testimony whereof I have hereunto set my hand in presence of two subscribing witnesses.

ARCHIBALD H. STEWART.

Witnesses:
LITTA D. JACKSON,
CHARLES E. JACKSON.

---

Copies of this patent may be obtained for five cents each, by addressing the "Commissioner of Patents, Washington, D. C."